(12) United States Patent
Takusagawa (10) Patent No.: US 6,553,465 B1
(45) Date of Patent: Apr. 22, 2003

(54) MULTIPROCESSOR SYSTEM WITH DISTRIBUTED SHARED MEMORY HAVING HOT PLUG FUNCTION FOR MAIN MEMORIES

(75) Inventor: Junichi Takusagawa, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/493,241

(22) Filed: Jan. 28, 2000

(30) Foreign Application Priority Data

Jan. 28, 1999 (JP) ............................................ 11-020337

(51) Int. Cl.[7] ............................................... G06F 12/16
(52) U.S. Cl. ........................ 711/152; 711/115; 711/155; 712/31
(58) Field of Search ................................. 711/115, 148, 711/152, 163, 165, 170, 162, 155; 712/31; 714/6, 7; 707/10

(56) References Cited

U.S. PATENT DOCUMENTS

| 4,571,707 A | * | 2/1986 | Watanabe | .................... 365/200 |
| 4,805,106 A | * | 2/1989 | Pfeifer | ....................... 710/200 |
| 4,975,838 A | * | 12/1990 | Mizuno et al. | ............. 709/221 |
| 5,546,532 A | * | 8/1996 | Trevett | ....................... 345/556 |
| 5,893,922 A | * | 4/1999 | Baylor et al. | ............... 711/148 |
| 6,088,769 A | * | 7/2000 | Luick et al. | ................. 711/141 |
| 6,101,497 A | * | 8/2000 | Ofek | .......................... 707/10 |
| 6,230,240 B1 | * | 5/2001 | Shrader et al. | ............. 711/114 |

FOREIGN PATENT DOCUMENTS

| JP | 5-073399 | 3/1993 |
| JP | 5-257796 | 10/1993 |
| JP | 8-153045 | 6/1996 |
| JP | 9-128354 | 5/1997 |
| JP | 9-282292 | 10/1997 |
| JP | 10-98524 | 4/1998 |

* cited by examiner

Primary Examiner—Gary J Portka
(74) Attorney, Agent, or Firm—McGinn & Gibb, PLLC (57) ABSTRACT

A multiprocessor system of a distributed shared memory structure has a hot plug function for main memories. Each of nodes of the multiprocessor system has a processor, an IO unit, a main memory, a mover, and a routing control unit. If a memory read access request is issued from the processor, the IO unit, or the mover to the main memory of a master node, the routing control unit instructs the master node to transfer the memory read access request. If a memory write access request is issued from the processor, the IO unit, or the mover to the main memory of the master node, the routing control unit instructs both the master node and a slave node to transfer the memory write access request when in a multicasting mode, and instructs only the master node to transfer the memory write access request when not in the multicasting mode.

7 Claims, 6 Drawing Sheets

MULTIPROCESSOR SYSTEM WITH DISTRIBUTED SHARED MEMORY HAVING HOT PLUG FUNCTION FOR MAIN MEMORIES

BACKGROUND OF THE INVENTION

1. Field of the Invention

The present invention relates to a multiprocessor system of a distributed shared memory structure having a plurality of nodes each comprising at least one processor and a main memory.

2. Description of the Related Art

To meet availability requirements, some information processing apparatus have a hot plug function to allow a faulty component to be replaced with a normal component without an apparatus shutdown when the information processing apparatus suffer a failure.

Some conventional devices including processors and I/O units are repairable on-line even when they are separated from the active system during system operation if the system can continuously be operated by backup devices and can relatively easily be separated or connected under the control of the operating system. Depending on the operating system, however, a fixed memory space is used in the main memory while the system is in operation, and the main memory is not connectable and disconnectable as a hot plug main memory as the fixed memory space cannot be separated.

In order to increase main memory availability, there have employed an apparatus having a duplex main memory configuration that allows a backup main memory to be used in the event of a failure of an active main memory, and an apparatus with a multiplex system structure. However, these apparatus are expensive because of the redundant function due to the duplex or multiplex scheme.

There has recently been proposed a multiprocessor system with a distributed shared memory configuration for increased performance and extendability. The multiprocessor often has a processor and a main memory that are installed on one printed-circuit board. The physical mounting structure of the multiprocessor poses a limitation on the use of a hot plug FRU (Field Replaceable Unit), and the printed-circuit board serves as one replaceable unit. Therefore, when the processor on the printed-circuit board suffers a fault and is to be replaced with a normal processor by a hot plug function, the main memory on the same printed-circuit board also needs to be replaced. Therefore, the main memory is required to have a hot plug function.

SUMMARY OF THE INVENTION

It is therefore an object of the present invention to provide a multiprocessor system of a distributed shared memory structure having a hot plug function for main memories.

For the purpose of separating a node from a multiprocessor system of a distributed shared memory structure during operation of the multiprocessor system, the memory space of a main memory managed by the node to be separated dynamically switches to the memory space of a main memory of a backup node without software recognition.

If a memory write access request is issued from a processor, an IO unit, or a mover to the main memory of a master node, then the memory write access request is transferred to the master node and a slave node when in a multicasting mode (for the transfer of the memory write access request to a plurality of nodes), and instructs only the master node to transfer a memory read access request when not in the multicasting mode. Therefore, when in the multicasting mode, a memory write process carried out on the main memory of the master node is also effected on the main memory of the slave node.

By copying data from the memory space of a node to be separated to the memory space of a backup node without a system shutdown, the node can be separated without stopping the operation of the system. Consequently, it is possible to repair a faulty area of the system without a system shutdown. As a result, the multiprocessor system can provide an information processing system of high availability.

A hardware-implemented mover function copies data from the memory space of the node to be separated to the memory space of the backup node, during which time a conflict with a memory access request issued from the processor or the IO unit is solved by hardware. When copying data from the memory space of the node to be separated to the memory space of the backup node without a system shutdown, the memory space from which data is to be copied can be accessed without the operating system recognizing the copying of the memory data. Therefore, the multiprocessor system can provide an information processing system of high availability regardless of the operating system.

Since all memory data is copied from the node to be separated to the memory space of the backup node upon separation of the node, the backup node is required only when copying the memory data, and a redundant node is not required to be available at all times. The cost of the multiprocessor system is relatively low as such a redundant node is not necessary during normal operation thereof.

Resources to be locked for use in ensuring inseparable operation of a memory read access request and a memory write access request to memories upon copying of the memory data are not all memory areas, but only memory addresses which need inseparable operation. Since memory addresses can individually be locked by a lock address buffer, the frequency of conflicts with memory access requests from processors and IO units is lowered. In this manner, the memory data can be copied without involving a reduction in the system capabilities during operation of the system.

The above and other objects, features, and advantages of the present invention will become apparent from the following descriptions with reference to the accompanying drawings which illustrate examples of the present invention.

DESCRIPTION OF THE PREFERRED EMBODIMENTS

Figure 1:
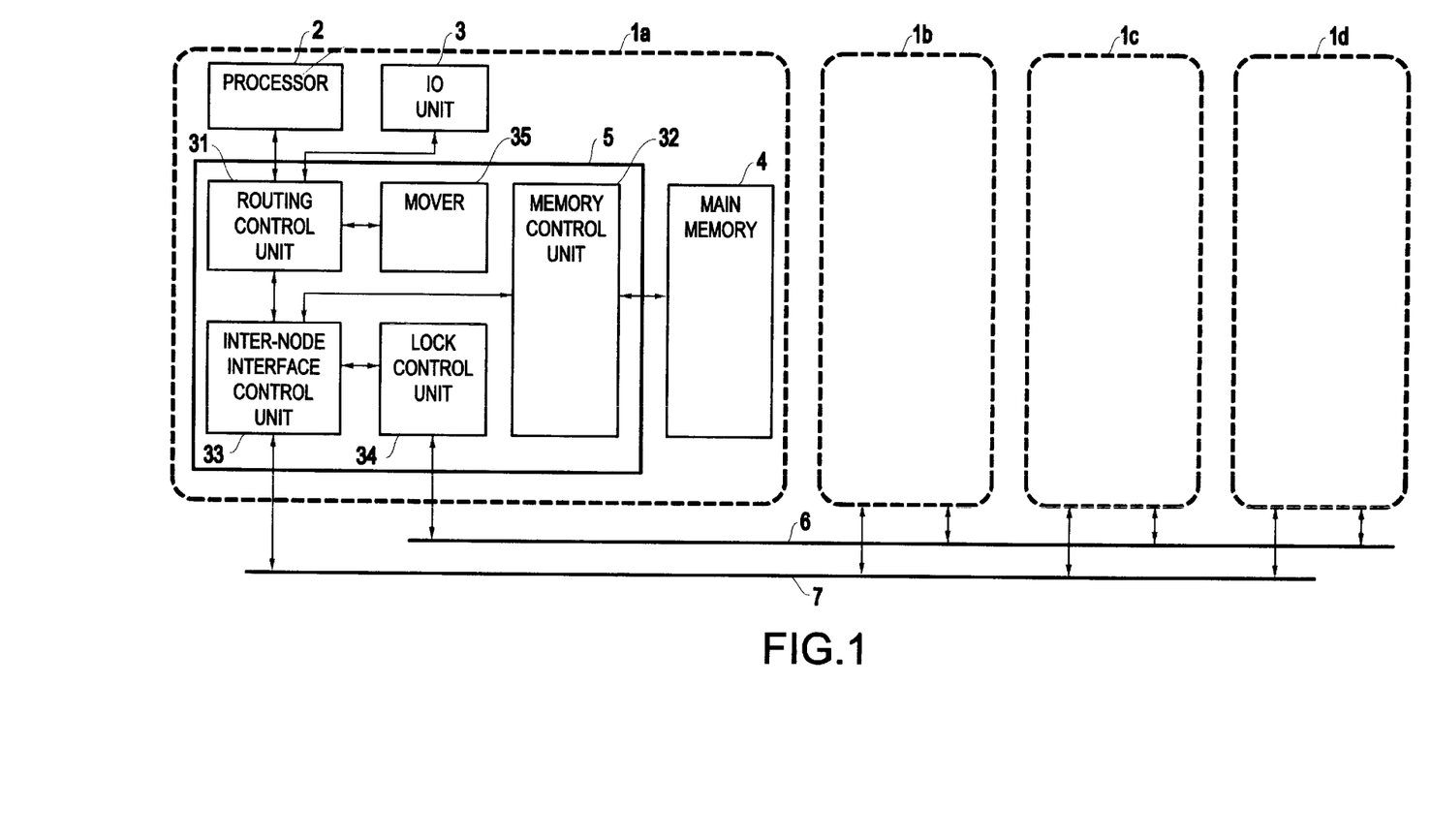
FIG. 1 is a block diagram of a multiprocessor system according to a first embodiment of the present invention.

Referring now to in FIG. 1, FIG. 1, a multiprocessor system according to a first embodiment of the present invention comprises a plurality of nodes 1a–1d, a lock bu 6, and a system bus 7. The node 1a has a processor 2, and IO unit 3, a main memory 4, and a system control unit (SCU) 5. The system control unit 5 has a routing control unit (RCU) 31, a memory control unit (MIU) 32, an inter-node interface control unit (SIU) 33, a lock control unit (LCU) 34, and a mover 35. The nodes 1b, 1c, 1d are structurally identical to the node 1a. The nodes 1a–1d are connected to each other by the lock bus 6 and the system bus 7.

In each of the nodes 1a–1d, a memory access request issued from the processor 2, the IO unit 3, or the mover 35. The RCU 31 determines which node the memory access request is destined for the main memory 4 in, adds routing information to the memory access request, and transfers the memory access request to the SIU 33.

If the memory access request received by the SIU 33 is destined for the main memory 4 in another node, then the SIU 33 issues a memory access request to the other node via the system bus 7.

When the SIU 33 receives a memory access request other than a locked or unlocked memory access request from the RCU 31 or the system bus 7, if the received memory access request is destined for the main memory 4 belonging to the SIU 33, then the SIU 33 transfers a lock address buffer index request to the LCU 34. The LCU 34 checks if the transferred address is locked or not, and sends the result to the SIU 33. If the SIU 33 recognizes from the result sent from the LCU 34 that the transferred address is not locked, then the SIU 33 transfers the memory access request via the MIU 32 to the main memory 4. If the SIU 33 recognizes from the result sent from the LCU 34 that the transferred address is locked, then the SIU 33 holds the memory access request and transfers the memory access request again to the LCU 34. This process is repeated until the memory access request becomes unlocked.

If the memory access request transferred from the RCU 31 or the system bus 7 to the SIU 33 is a locked memory read request for its own node, then the SIU 33 transfers a lock request to the LCU 34. If the address of the received locked request is unlocked, then the LCU 34 locks the address and sends an indication of locking success to the SIU 33. When the SIU 33 receives the indication of locking success from the LCU 34, the SIU 33 transfers the memory read request to the MIU 32. If the address of the received locked memory read request is locked, then the LCU 34 sends an indication of locking failure to the SIU 33 and the lock bus 6. In response to the received indication of locking failure, the SIU 33 eliminates the locked memory read request. When the SCU 5 of a request source receives the indication of locking failure from the lock bus 6, the SCU 5 sends the indication of locking failure to a request source apparatus. When the request source apparatus receives the indication of locking failure, the request source apparatus re-issues a locked memory read request.

If the memory access request transferred from the RCU 31 or the system bus 7 to the SIU 33 is an unlocked memory write request for its own node, then the SIU 33 transfers a memory write request to the MIU 32 and also transfers an unlock request to the LCU 34. The LCU 34 unlocks the address of the received unlock request.

Figure 2:
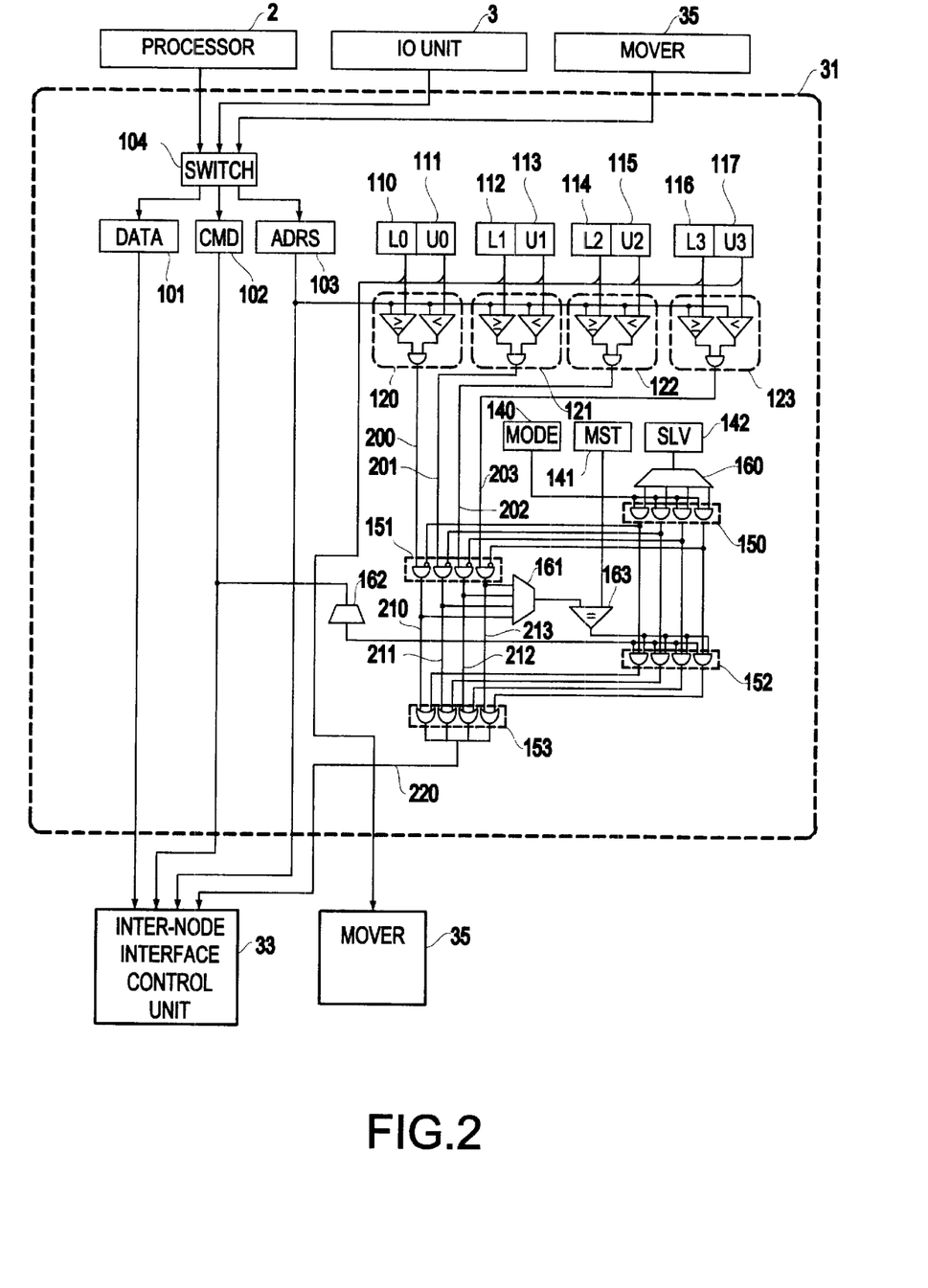
FIG. 2 is a block diagram of a routing control unit in the multiprocessor system shown in FIG. 1.

A detailed structure of the RCU 31 will be described below. FIG. 2 shows the RCU 31 in block form. As shown in FIG. 2, the RCU 31 has registers 101, 102, 103 for receiving memory access requests from the processor, and a switch 104 for switching the outputs from the processor 2, IO unit 3, and the mover 35. The register 101 holds write data when a memory write request is received. The register 102 holds the type of a memory access request. The register 103 holds the memory address of a memory access request.

The RCU 31 also has routing control registers 110, 111, 112, 113, 114, 115, 116, 117 for controlling which node a memory access request is to be sent to. The register 110 holds the lower limit value of an address space of the main memory of the node 1a, and the register 111 holds the upper limit value of the address space of the main memory of the node 1a. Similarly, the registers 112, 113 correspond to the node 1b, the registers 114, 115 to the node 1c, and the registers 116, 117 to the node 1d.

A combining circuit 120 is supplied with values from the registers 103, 110, 111, and outputs "1" to a connection line 200 if the memory access request indicated by the register 103 is a memory access request for the main memory 4 of the node 1a. Similarly, a combining circuit 121 is supplied with values from the registers 103, 112, 113, and outputs "1" to a connection line 201 if the memory access request indicated by the register 103 is a memory access request for the main memory 4 of the node 1b. A combining circuit 122 is supplied with values from the registers 103, 114, 115, and outputs "1" to a connection line 202 if the memory access request indicated by the register 103 is a memory access request for the main memory 4 of the node 1c. A combining circuit 123 is supplied with values from the registers 103, 116, 117, and outputs "1" to a connection line 203 if the memory access request indicated by the register 103 is a memory access request for the main memory 4 of the node 1c. Therefore, signals on the connection lines 200, 201, 202, 203 represent routing information indicating the destinations of memory access requests held by the registers 101, 102, 103.

A flag 140 represents "1" if the transfer of a memory write request to a plurality of nodes (multicasting mode) is indicated. A register 141 holds master node information in an encoded form. A register 142 holds slave node information in an encoded form.

If the transfer of a memory write request to a plurality of nodes is indicated by the flag 140, a routing instruction for the node indicated by slave node information held by the register 142 is masked by combining circuits 160, 150, 151, and processed into routing information represented by connection lines 210, 211, 212, 213. Therefore, when a multicasting mode is represented by the flag 140, the value of the slave node information held by the register 142 is ignored.

A combining circuit 162 decodes command information of a memory access request from the register 102. If the decoded command information indicates a memory write request, then the combining circuit 162 outputs "1" to a combining circuit 152.

Combining circuits 161, 163 output "1" to the combining circuit 152 if the routing destination of a memory access request represented by the connection lines 210, 211, 212, 213 is a master cell indicated by the register 141. The combining circuit 162 outputs "1" to the combining circuit 152 if the memory access request set in the register 102 is a memory write request. Therefore, if the memory access request is a memory write request, the transfer of the memory access request to a plurality of nodes is indicated, and the routing destination represented by the connection lines 210, 211, 212, 213 is a master node, then the combining circuit 152 and a combining circuit 153 add the slave node represented by the register 142 as a routing destination, whose information is transferred as routing information represented by a connection line 220 to the SIU 33 added to the memory access request.

Figure 3:
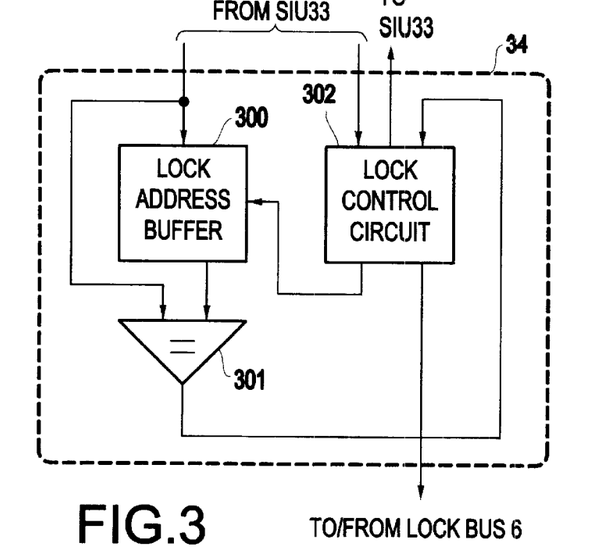
FIG. 3 is a block diagram of a lock control unit in the multiprocessor system shown in FIG. 1.

A detailed structure of the LCU 34 will be described below. FIG. 3 shows the LCU 34 in block form. As shown in FIG. 3, the LCU 34 has a lock address buffer 300 for holding a locked main memory address, a comparing circuit 301 for comparing the data held by the lock address buffer 300 with the memory addresses of a lock request, an unlock request, and a lock address buffer index request transferred from the SIU 33 to determine whether they agree with each other, and a lock control circuit 302 for receiving the compared result from the comparing circuit 301 and a lock address buffer access request from the SIU 33, controlling the lock address buffer 300, and indicates locking success/failure to the SIU 33 and the lock bus 6.

When the SIU 33 transfers a lock address buffer access request to the LCU 34, the lock control circuit 302 receives the compared result from the comparing circuit 301, and indicates that the transferred address is locked to the SIU 33 if the same address as the memory access request address has already been registered in the lock address buffer 300. If the same address as the memory access request address has not been registered in the lock address buffer 300, then the SIU 33 indicates that the transferred address is not locked to the SIU 33.

When the SIU 33 transfers a lock request to the LCU 34, the locking control circuit 302 receives the compared result from the comparing circuit 301, and issues an indication of locking failure to the SIU 33 and the lock bus 6 if the same address as a locked memory read request address has already been registered in the lock address buffer 300. If the same address as a locked memory read request address has not been registered in the lock address buffer 300, then the locking control circuit 302 issues an indication of locking success to the SIU 33 and the lock bus 6, and instructs the lock address buffer 300 to register the address of the lock request. When the SIU 33 transfers an unlock request to the LCU 34, the locking control circuit 302 receives the compared result from the comparing circuit 301, and instructs the lock address buffer 300 to delete an entry which agrees with the address of the unlock request among those addresses which are registered in the lock address buffer 300.

Indications of locking success and locking failure sent from other nodes via the lock bus are reported via the lock control circuit 302 to the RCU 31.

Figure 4:
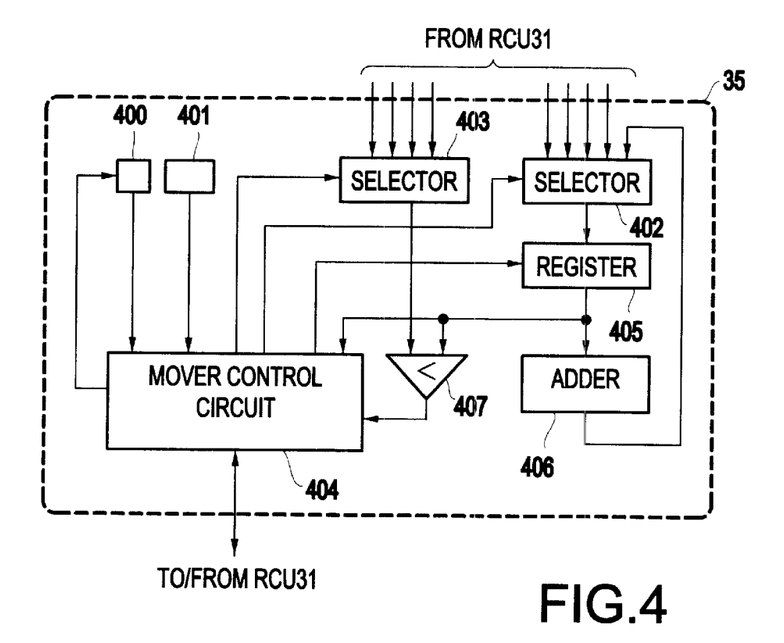
FIG. 4 is a block diagram of a mover in the multiprocessor system shown in FIG. 1.

A detailed structure of the mover 35 will be described below. FIG. 4 shows the mover 35 in block form. As shown in FIG. 4, the mover 35 has a flag 400 for indicating the activation of the mover 35, a register 401 for indicating a node to which the mover 35 carries out memory copying, a selector 402 which is supplied with output signals from the registers 110, 112, 114, 116 of the RCU 31 and an adder 406 and controlled by a mover control circuit 404, a selector 403 which is supplied with output signals from the registers 111, 113, 115, 117 of the RCU 31 and an adder 406 and controlled by the mover control circuit 404, a register 405 for holding the memory address of a memory access request issued to the RCU 31, an adder 406 for adding a particular value to the value of the register 405, e.g., adding "8" to the value of the register 405 if the unit of a memory access request issued by the mover 35 is 8 bytes, and a comparator 407 for comparing the value of the selector 403 and the value of the register 405 with each other.

If "1" is set to the flag 400, then the mover control circuit 404 controls the selector 402 to set the start address of a memory access request in the register 405 based on node information indicated by the register 401. Similarly, the mover control circuit 404 controls the selector 403 to enter the end address of the memory access request into the comparator 407. Based on the address entered from the register 405, the mover control circuit 404 issues a locked memory read request to the RCU 31. If an indication of locking failure is returned for the locked memory read request, then the mover control circuit 404 issues again a locked memory read request to the RCU 31 using the same address. If reply data is returned for the locked memory read request, then the mover control circuit 404 issues an unlocked memory write request to the same address. When the unlocked memory write request is completed, the selector 402 selects an address counted up by the adder 406, and enters the selected address into the register 405. While counting up the address, the mover control circuit 404 repeatedly issues a locked memory read request and an unlocked memory write request to the RCU 31. If the comparator 407 detects when the address of the register 405 exceeds the address from the selector 403, the mover control circuit 404 resets the flag 400, and finishes the issuance of the memory access request to the RCU 31.

Operation of the multiprocessor system for separating/connecting a node will be described below with reference to FIG. 5.

In this embodiment, it is assumed that the nodes 1a, 1b, 1c shown in FIG. 1 are operating as active system nodes, and when the node 1a suffers a fault, the node 1a is separated, and the node 1d is newly connected to the system.

Figure 5:
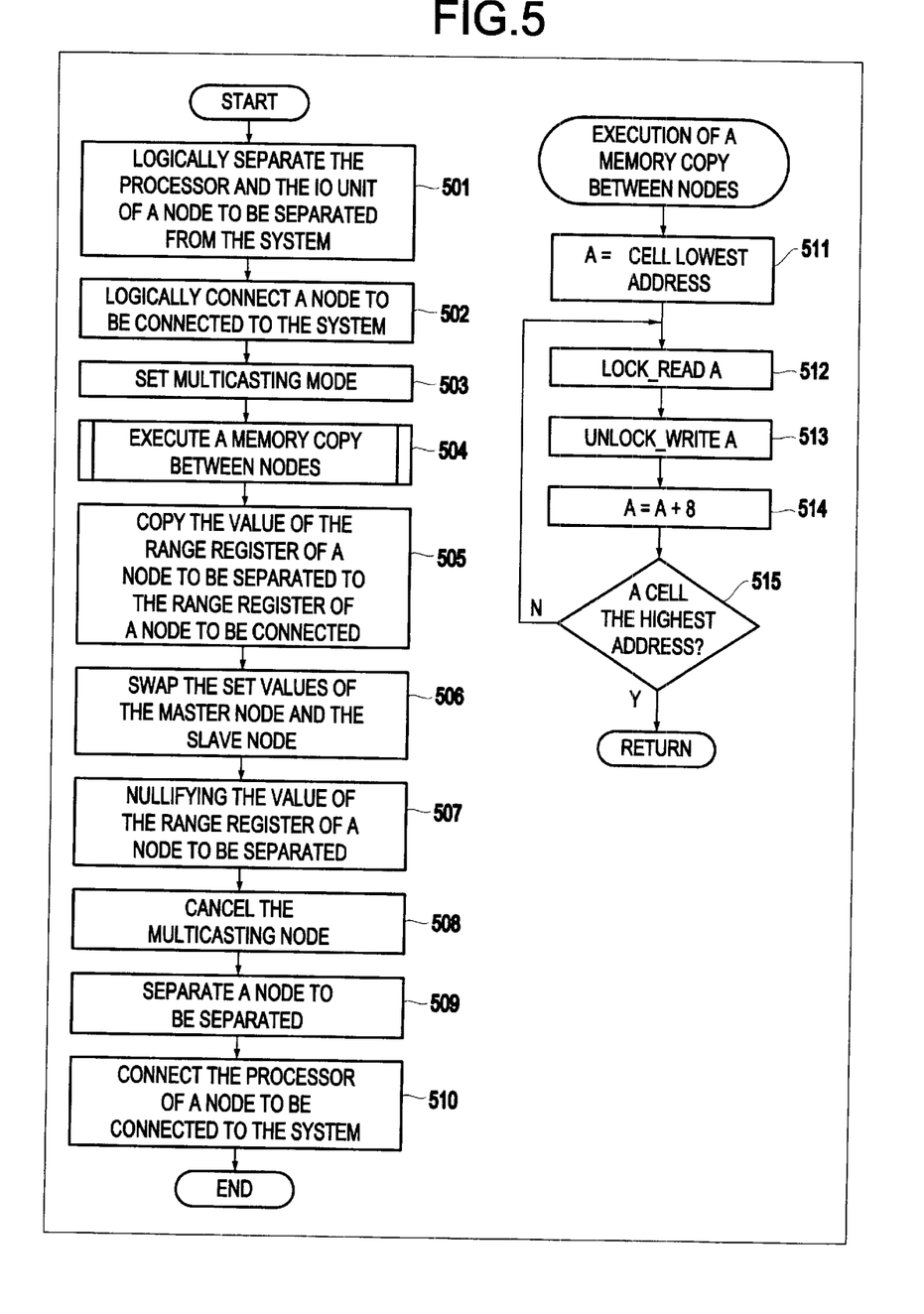
FIG. 5 is a flowchart of a sequence for separating and connecting a node in the multiprocessor system shown in FIG. 1.

In step 501 shown in FIG. 5, the processor 2 and the IO unit 3 of the node 1a are logically separated from the system.

Then, in step 502, the node 1d is logically connected to the system bus 7 and the lock bus 6.

In step 503, the flags 140 of all the nodes are set to "1", the registers 141 of all nodes are set to the node number of the separated node 1a, and the registers 142 of all nodes are set to the node number of the connected node 1d. At this time, memory write access requests issued to the main memory 4 of the node 1a from the processors 2, the IO units 3, and the movers 35 which are operating in the nodes 1b, 1c are also issued to the main memory 4 of the node 1d.

Then, the register 401 in the mover 35 of the node 1d is set to the node number of the separated node 1a, and the flag 400 is set to "1". In step 504 and 505 (steps 511–514), the mover 35 executes a locked memory read request and an unlocked memory write request thoroughly in a memory space between lower and upper limit addresses in the main memory 4 of the node 1a, and copies the data in the main memory 4 of the node 1a to the main memory 4 of the node 1d. Upon completion of the memory data copying, the main memory 4 of the node 1a and the main memory 4 of the node 1d hold the same data.

At this time, the memory access request issued from the mover 35 is locked because memory write requests should be prevented from being eliminated if the memory addresses of memory write requests issued from the processors 2 or the IO units 3 of the nodes 1b, 1c conflict with each other while the memory data copying is being carried out by the mover 35.

When the memory data copying is completed, the registers 116 of all the nodes are set to the value of the register 110, and the values of the registers 141 and the registers 142 of all the nodes are swapped, in step 506. At this time, memory read access requests issued from the processors 2 and the IO units 3 which are operating in the nodes 1b, 1c to the main memory 4 of the node 1a are executed on the main memory 4 of the node 1d, and memory write access requests issued therefrom are executed on the main memories 4 of the nodes 1a, 1d.

Then, in step 507, the registers 110, 111 of all the nodes are set to "0", nullifying the address space in the node 1a. In step 508, the registers 140 of all the nodes are set to "0", canceling the multicasting mode. At this time, the main memory 4 of the node 1a is separated from the active system, and the main memory 4 of the node 1d is connected to the active system in step 509.

Thereafter, in step 510, the processor 2 and the IO unit 3 of the node 1d are connected to the active system, whereupon the node 1a and the node 1d are completely switched around.

Figure 6:
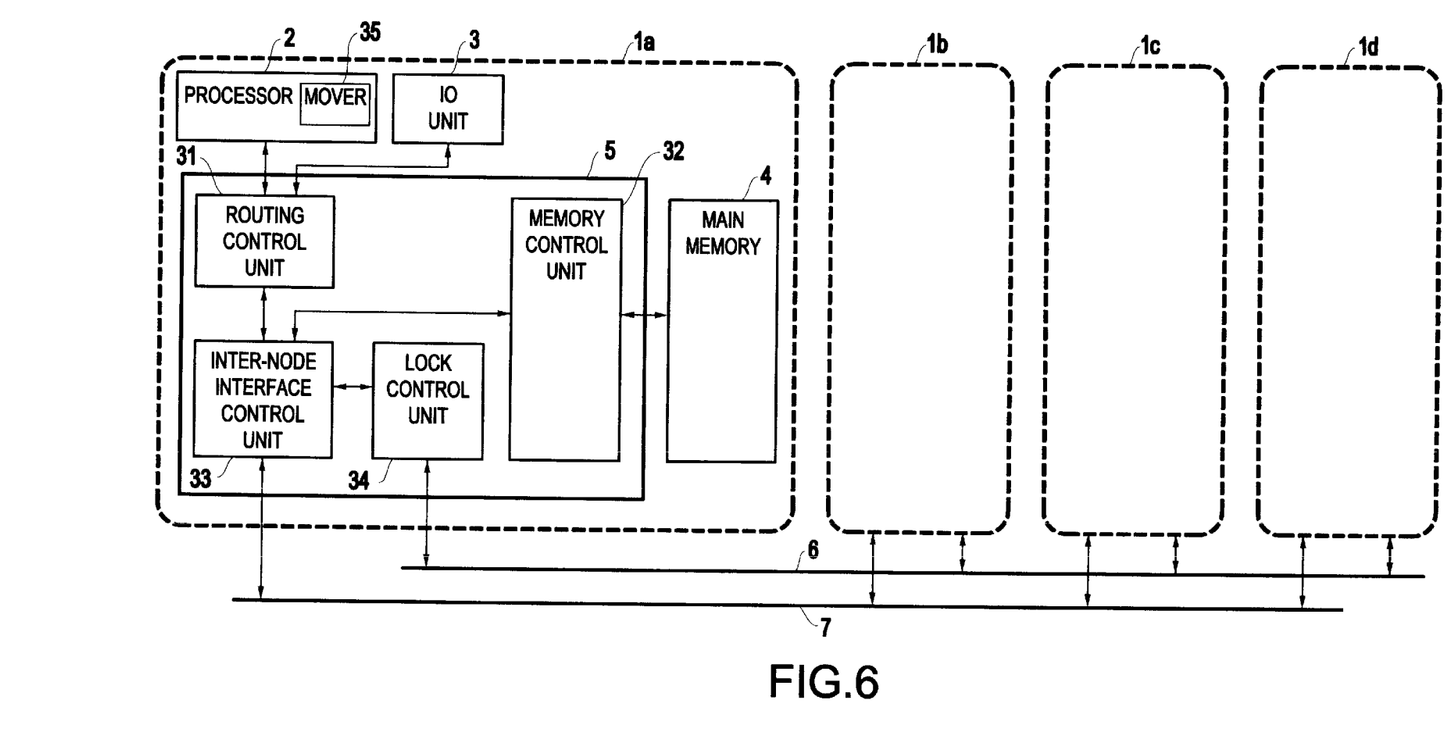
FIG. 6 is a block diagram of a multiprocessor system according to a second embodiment of the present invention.

FIG. 6 shows in block form a multiprocessor system according to a second embodiment of the present invention. The multiprocessor system shown in FIG. 6 differs from the multiprocessor system shown in FIG. 1 in that the mover 35 is removed from the SCU 5. While the mover 35 is hardware-implemented according to the first embodiment, all the functions of the mover 35 are implemented by the software that controls the processor 2 according to the second embodiment. In the second embodiment, the processor 2 issues a locked memory read request and an unlocked memory write request for memory data copying between nodes.

Figure 7:
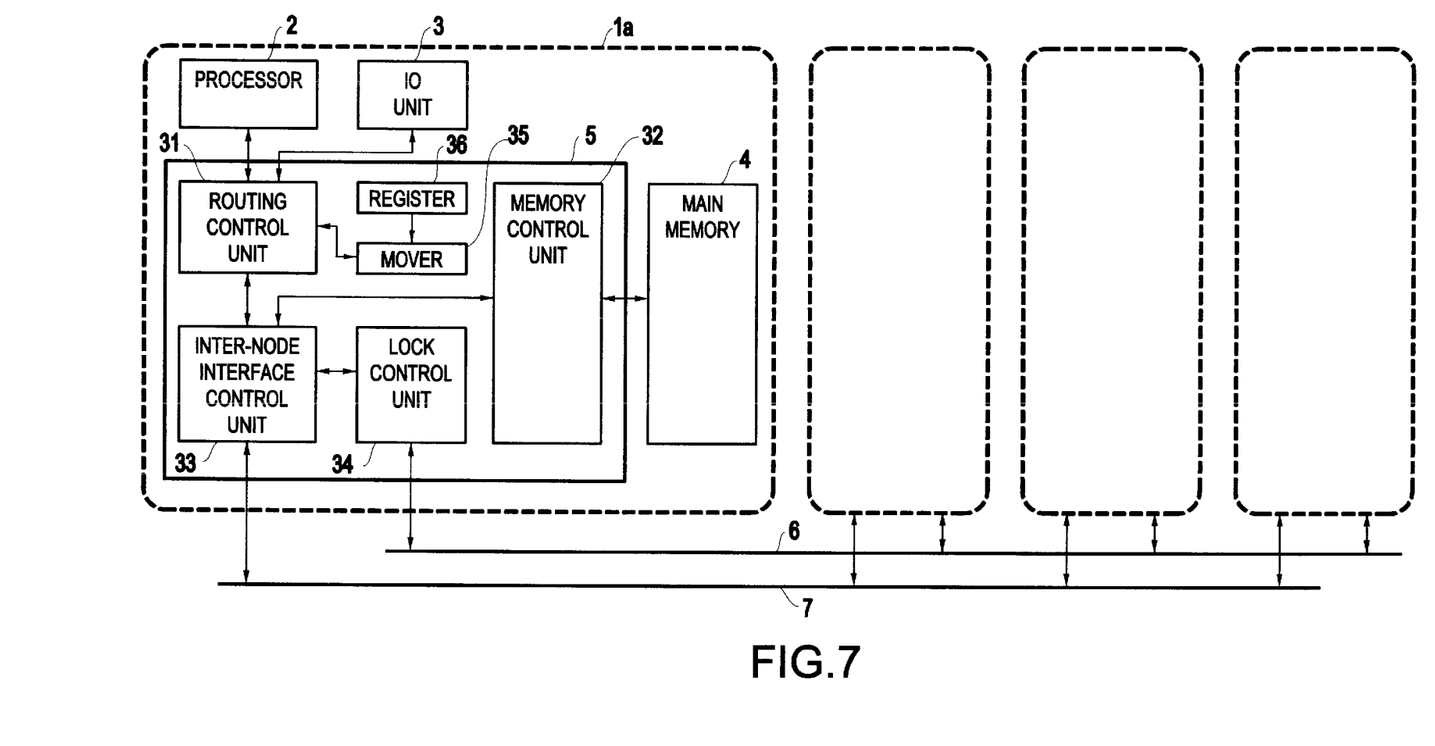
FIG. 7 is a block diagram of a multiprocessor system according to a third embodiment of the present invention.

FIG. 7 shows in block form a multiprocessor system according to a third embodiment of the present invention. In FIG. 7, a register 36 serves to hold an address suffering a fault in the main memory 4, and provide fault address information to the mover 35. When the main memory 4 suffers a fault and is to be disconnected, if the faulty main memory is accessed for memory data copying by the mover 35, then error data is read and a new fault is detected. To avoid such a drawback, when the mover 35 issues a memory access request for memory data copying, the mover 35 compares memory addresses with the address stored in the register 36. If a memory address agrees with the address stored in the register 36, then the mover 35 inhibits memory access to the memory address, and skips to a next memory address.

While preferred embodiments of the present invention have been described using specific terms, such description is for illustrative purposes only, and it is to be understood that changes and variations may be made without departing from the spirit or scope of the following claims.

What is claimed is:

1. A multiprocessor system of a distributed shared memory structure having a plurality of nodes each comprising at least one processor and a main memory, comprising:
   means for managing the same memory addresses in two nodes;
   means for holding information of the two nodes as a master node and a slave node;
   means for transferring a read access request from one of a processor and an I/O unit with respect to said main memory to a master node;
   a flag indicative of whether a write access request from one of the processor and the I/O unit with respect to said main memory is to be transferred to the master node or to the master node and the slave node;
   means for transferring the write access request to the master node if said flag indicates that the write access request is to be transferred to the master node;
   means for transferring the write access request to the master node and the slave node if said flag indicates that the write access request is to be transferred to the master node and the slave node;
   means for holding address information of a memory space of the main memory of each of the nodes;
   lock read access means for reading data from the main memory of the master node based on said address information in response to a locked read access request;
   unlock write access means for writing the data read by said lock read access means into the main memories of the master node and the slave node in response to an unlocked write access request;
   memory copying means for inseparably executing said lock read access request and said unlocked write access request; and
   means for effecting memory copying by said memory copying means on the memory space of the main memory of said master node.

2. A multiprocessing system according to claim 1, further comprising:
   a lock address buffer for inseparably executing a read access request and a write access request for said memory copying;
   means for registering an address of said locked read access request in said lock address buffer in response to said locked read access request;
   means for deleting the same address as said unlocked write access request from said lock address buffer in response to said unlocked write access request; and
   means for inhibiting said read access request and said write access request until the memory address of a memory access request is deleted from said lock address buffer if the memory address of the memory access request sent from said processor or said IO unit to said main memory has already been registered in said lock address buffer.

3. A multiprocessor system of a distributed shared memory structure having a plurality of nodes each comprising at least one processor, an IO unit, a main memory, and a system control unit, said system control unit comprising a routing control unit, a memory control unit, an inter-node interface control unit, a lock control unit, and a mover;
   said routing control unit having means for being supplied with a memory access request issued from said processor, said IO unit, or said mover, determining which node the memory access request is destined for the main memory in, adding routing information to the memory access request, and transferring the memory access request to said inter-node interface control unit;
   said inter-node interface control unit having means for, if the memory access request transferred from said routing control unit is destined for the main memory of another node, issuing a memory access request to said other node via a system bus, and, if a memory access request other than a locked or unlocked memory access request received from said routing control unit or the system bus is destined for the main memory of its own node, transferring a lock address buffer index request to said lock control unit, and, if said lock control unit indicates that a transferred address is not locked, transferring the memory access request via said memory control unit to said main memory, and, if said lock control unit indicates that the transferred address is locked, holding the memory access request and transferring a memory access request address again to said lock control unit, and repeating the above process until the memory access request address is unlocked, and means for, if the memory access request transferred from said routing control unit or the system bus is a locked memory read request destined for its own node, transferring a lock request to said lock control unit, if an indication of locking success is received from said lock control unit, transferring the memory read request to said memory control unit, if an indication of locking failure is received from said lock control unit, eliminating the locked memory read request, and if the memory access request transferred from said routing control unit or the system bus is an unlocked memory write request destined for its own node, transferring the memory write request to said memory control unit, and transferring an unlock request to said lock control unit;

said lock control unit having means for determining whether the transferred address is locked or not when said lock address buffer index request is transferred, and indicating the determined result to said inter-node interface control unit, and, if the address of said lock request is unlocked, locking said address and sending an indication of locking success to said inter-node interface control unit, and, if the address of said lock request is locked, sending an indication of locking failure to said.inter-node interface control unit and a lock bus, and unlocking the address of said unlock request when said unlock request is received.

4. A multiprocessor system according to claim 3, wherein said routing control unit comprises:

a first register for holding write data when the memory write request is received and outputting the write data to said inter-node interface control unit;

a second register for holding the type of the memory access request and outputting the type of the memory access request to said inter-node interface control unit;

a third register for holding the memory address of the memory access request and outputting the memory address to said inter-node interface control unit;

a flag for indicating the transfer of the memory write request to a plurality of nodes;

a fourth register for holding master node information;

a fifth register for holding slave node information;

sixth and seventh registers for holding lower and upper limit values, respectively, of the address space of the main memory of each of said nodes;

first combining circuits associated respectively with said sixth and seventh registers, for comparing the memory address held by said third register with the lower and upper limit values of the address space which are held respectively by said sixth and seventh registers, and making respective output signals active if the memory address is between said lower and upper limit values of the address space; and a second combining circuit for outputting the node corresponding to the active output signal of the output signals from said first combining circuits, as routing information indicative of a routing destination to said inter-node interface control unit if the transfer of the memory write request to a plurality of nodes is not indicated, and adding a slave node held by said fifth register as a routing destination and outputting the routing destination as routing information to said inter-node interface control unit if the transfer of the memory write request to a plurality of nodes is indicated, a node corresponding to the active output signal from said first combining circuits is a master node held by said fourth register, and the memory access request held by said second register is a memory write request.

5. A multiprocessor system according to claim 4, wherein said lock control unit comprises:

a lock address buffer for holding a locked main memory address;

a comparing circuit for comparing the data held by said lock address buffer with the memory addresses of a lock request, an unlock request, and a lock address buffer index request transferred from said inter-node interface control unit to determine whether they agree with each other; and a lock control circuit for receiving a lock address buffer access request from said inter-node interface control unit, and, if the compared result from said comparing circuit indicates that the same address as the memory access request has already been registered in said lock address buffer, indicating that the transferred address is locked to said inter-node interface control unit, and, if the compared result from said comparing circuit indicates that the same address as the memory access request has not been registered in said lock address buffer, indicating that the transferred address is not locked to said inter-node interface control unit, and, if the compared result from said comparing circuit indicates that the same address as the locked memory read request has already been registered in said lock address buffer when the lock request is transferred from said inter-node interface control unit, issuing an indication of locking failure to said inter-node interface control unit and the lock bus, and, if the compared result from said comparing circuit indicates that the same address as the locked memory read request has not been registered in said lock address buffer, issuing an indication of locking success to said inter-node interface control unit and the lock bus, and instructing said lock address buffer to register the address of the lock request, and instructing said lock address buffer to delete an entry which agrees with the address of the unlock request among those addresses which are registered in the lock address buffer, in response to the compared result from said comparing circuit when the unlock request is transferred.

6. A multiprocessor system according to claim 4, wherein said mover comprises:

a flag for indicating the activation of the mover;

a first register for indicating a node to which the mover carries out memory copying;

a first selector for being supplied with an address held by said seventh register of said routing control unit;

a second selector for being supplied with an address held by said sixth register of said routing control unit;

a second register for holding a memory address of a memory access request outputted from said second selector and issued to said routing control unit;

an adder for adding a particular value to the memory address outputted from said second register and entering the sum into said selector;

a comparator for comparing an output from said first selector and the memory address outputted from said second register with each other; and a mover control circuit for, if said flag indicates the activation of the mover, controlling said second selector to set the start address of a memory access request in said second register based on node information indicated by said first register, and controlling said first selector to enter the end address of the memory access request into said comparator, issuing a locked memory read request to said routing control unit based on the address entered from said second register, and, if an indication of locking failure is returned for the locked memory read request, issuing a locked memory read request again to said routing control unit using the same address, and, if reply data is returned for the locked memory read request, issuing an unlocked memory write request to the same address, and, when the unlocked memory write request is completed, causing said second selector to select an address counted up by said adder and entering the selected address into said second register, and, while counting up the address, repeatedly issuing a locked memory read request and an unlocked memory write request to said routing control unit, and, if said comparator detects when the address of said second register exceeds the address from said first selector, resetting said flag, and finishing the issuance of the memory access request to said routing control unit.

7. A multiprocessor system according to claim 5, wherein said mover comprises:

a flag for indicating the activation of the mover;

a first register for indicating a node to which the mover carries out memory copying;

a first selector for being supplied with an address held by said seventh register of said routing control unit;

a second selector for being supplied with an address held by said sixth register of said routing control unit;

a second register for holding a memory address of a memory access request outputted from said second selector and issued to said routing control unit;

an adder for adding a particular value to the memory address outputted from said second register and entering the sum into said selector;

a comparator for comparing an output from said first selector and the memory address outputted from said second register with each other; and a mover control circuit for, if said flag indicates the activation of the mover, controlling said second selector to set the start address of a memory access request in said second register based on node information indicated by said first register, and controlling said first selector to enter the end address of the memory access request into said comparator, issuing a locked memory read request to said routing control unit based on the address entered from said second register, and, if an indication of locking failure is returned for the locked memory read request, issuing a locked memory read request again to said routing control unit using the same address, and, if reply data is returned for the locked memory read request, issuing an unlocked memory write request to the same address, and, when the unlocked memory write request is completed, causing said second selector to select an address counted up by said adder and entering the selected address into said second register, and, while counting up the address, repeatedly issuing a locked memory read request and an unlocked memory write request to said routing control unit, and, if said comparator detects when the address of said second register exceeds the address from said first selector, resetting said flag, and finishing the issuance of the memory access request to said routing control unit.

* * * * *